3,186,970
PREPARATION OF POLYHYDROXYARYL PARTIAL ACETALS OF POLYVINYL ALCOHOL
Norman W. Schuler, Lexington, Mass., assignor to Polaroid Corporation, Cambridge, Mass., a corporation of Delaware
No Drawing. Filed July 31, 1961, Ser. No. 127,865
1 Claim. (Cl. 260—73)

The present invention is concerned with a novel process for preparing polymers.

One object of this invention is the novel synthesis of polymers containing a polyhydroxyaryl substituent.

Another object of this invention is to provide a process for the preparation of polyhydroxyaryl partial acetals of polyvinyl alcohol polymers and copolymers.

The invention accordingly comprises the several steps and the relation and order of one or more of such steps with respect to each of the others, and the scope of the application of which will be indicated in the claims.

For a fuller understanding of the nature and objects of the invention, reference should be had to the following detailed description.

Polymers with polyhydroxyaryl-containing substituents, particularly p-dihydroxyphenyl-containing substituents, such as hydroquinone substituents, are of great interest, particularly in the photographic arts (note, e.g., U.S. Patent No. 2,710,801). However, most of the known methods of preparation also involve side reactions, which frequently result in an impure, cross-linked, discolored, insoluble product. In the copending U.S. application of Lloyd D. Taylor, Serial No. 100,019, filed April 3, 1961, one convenient method of preparing polymers of this type without such side reactions has been disclosed. Accordingly, this invention provides an additional novel method of preparing such polymers without any undesirable side reactions during preparation, such as oxidation or cross-linking.

One method of preparing such substituted polymers comprises reacting the aldehyde of the desired polyhydroxyaryl substituent with the polyhydroxy polymer, thereby forming an acetal-substituted polymer. However, such a reaction frequently results in the above-described undesirable side reactions such as oxidation or cross-linking with the resultant discolored, impure product.

The novel process of this invention involves converting the hydroxyl groups of the aldehyde of the desired polyhydroxaryl substituent to the acyl derivative, preferably the acetoxy derivative, thereby preventing the hydroxyl groups from entering into side reactions during acetal formation, which might result in insolubility or lack of purity of the product. After preparation of the substituted partial acetal of the polymer, the acetoxy protecting groups can be readily removed to provide the desider polyhydroxyaryl substituted polymer.

In a preferred embodiment the aldehyde of a dihydroxyphenyl compound, preferably gentisaldehyde, is converted to the protected or acylated derivative, preferably the diacetoxy derivative, and reacted with a polyvinyl alcohol. The protective groups on the substituent are then removed, as by alcoholysis. Such polymers are then ready for further use, for example, photographic employment.

It should be understood that in addition to polyvinyl alcohol, copolymers of vinyl alcohol, such as the ethylene copolymer of vinyl alcohol, may be used.

As examples of suitable aldehydes mention may be made of aldehydes of polyhydroxyphenyl compounds such as catechol, resorcinol, hydroquinone, pyrogallol, hydroxyhydroquinone, and aldehydes of polyhydroxynaphthyl compounds. It should also be understood that the aromatic radical may be substituted, in addition to the hydroxyl groups, by, for example, chlorine or methyl groups. The aldehyde group may be attached directly to the aromatic ring, as in gentisaldehyde, or it may be attached to an aliphatic substituent.

The preparation of the acyl derivative, the acetal condensation to form the substituted polymer, and the removal of the protecting acyl groups may be accomplished by procedures well known to the art.

The acyl protecting groups are preferably removed by alkaline alcoholysis in an inert atmosphere, but it should be understood that under some conditions an acid system may be used providing the acetal linkage is not attacked.

Polymers prepared by the process of this invention are polyvinyl alcohol polymers and copolymers containing random units of dihydroxy aromatic acetal substituents.

The following example is given for purposes of illustration only.

*Example*

17 grams of 2,5-dihydroxybenzaldehyde (gentisaldehyde) were dissolved in 50 ml. of acetic anhydride and 3 ml. of dry pyridine were added. The resulting reaction was exothermic and the solution was allowed to come to room temperature over a two-hour period. The solution was then poured on crushed ice and, after washing with water, 23 grams of light colored crystals were recovered. After distilling at 167° C. at 1 mm., 18 grams of 2,5-diacetoxybenzaldehyde, melting at 66–68° C., were recovered.

4 grams of polyvinyl alcohol were added to a mixture of 15 grams of 2,5-diacetoxybenzaldehyde in 30 ml. of glacial acetic acid under nitrogen. 0.5 ml. of 85% phosphoric acid was added and the reaction was heated to 60° C. and stirred for 4 hours. The resulting 2,5-diacetoxybenzaldehyde partial acetal of polyvinyl alcohol was separated by precipitation into ether and purified by reprecipitation from dioxane into ether.

Deacylation was then carried out under nitrogen in the following manner. 8 grams of the polymer were then dissolved in 40 ml. of dioxane. 25 ml. of methanol were added slowly to prevent precipitation of the polymer. An additional 10 ml. of methanol containing a small amount of freshly prepared sodium methoxide were added and the mixture stirred 1½ hours. The gentisaldehyde partial acetal of polyvinyl alcohol product was isolated by precipitation into dilute acid and purified by reprecipitation into water and then dried.

The polymers produced by the novel process of this invention are useful as nondiffusing reducing agents to prevent fog or stain in photographic emulsions.

Since certain changes may be made in the above process without departing from the scope of the invention herein involved, it is intended that all matter contained in the above description shall be interpreted as illustrative and not in a limiting sense.

What is claimed is:

The process of preparing the gentisaldehyde partial acetal of polyvinyl alcohol which comprises the steps of reacting gentisaldehyde with acetic anhydride to provide 2,5-diacetoxybenzaldehyde; reacting the thus-prepared 2,5-diacetoxybenzaldehyde with polyvinyl alcohol to provide the 2,5-diacetoxybenzaldehyde partial acetal of polyvinyl alcohol; and deacetylating the thus-prepared 2,5-diacetoxybenzaldehyde partial acetal of polyvinyl alcohol by alkaline alcoholysis to provide the gentisaldehyde partial acetal of polyvinyl alcohol.

References Cited by the Examiner

UNITED STATES PATENTS

| 2,710,801 | 6/55 | Minsk | 260—73 |
| 2,906,736 | 9/59 | Cassidy | 260—47 |

OTHER REFERENCES

D. J. Cram and G. S. Hammond: "Organic Chemistry," McGraw-Hill Book Company, Inc., New York, N.Y., 1959, p. 309.

WILLIAM H. SHORT, *Primary Examiner.*

H. N. BURSTEIN, *Examiner.*